Figure 1:
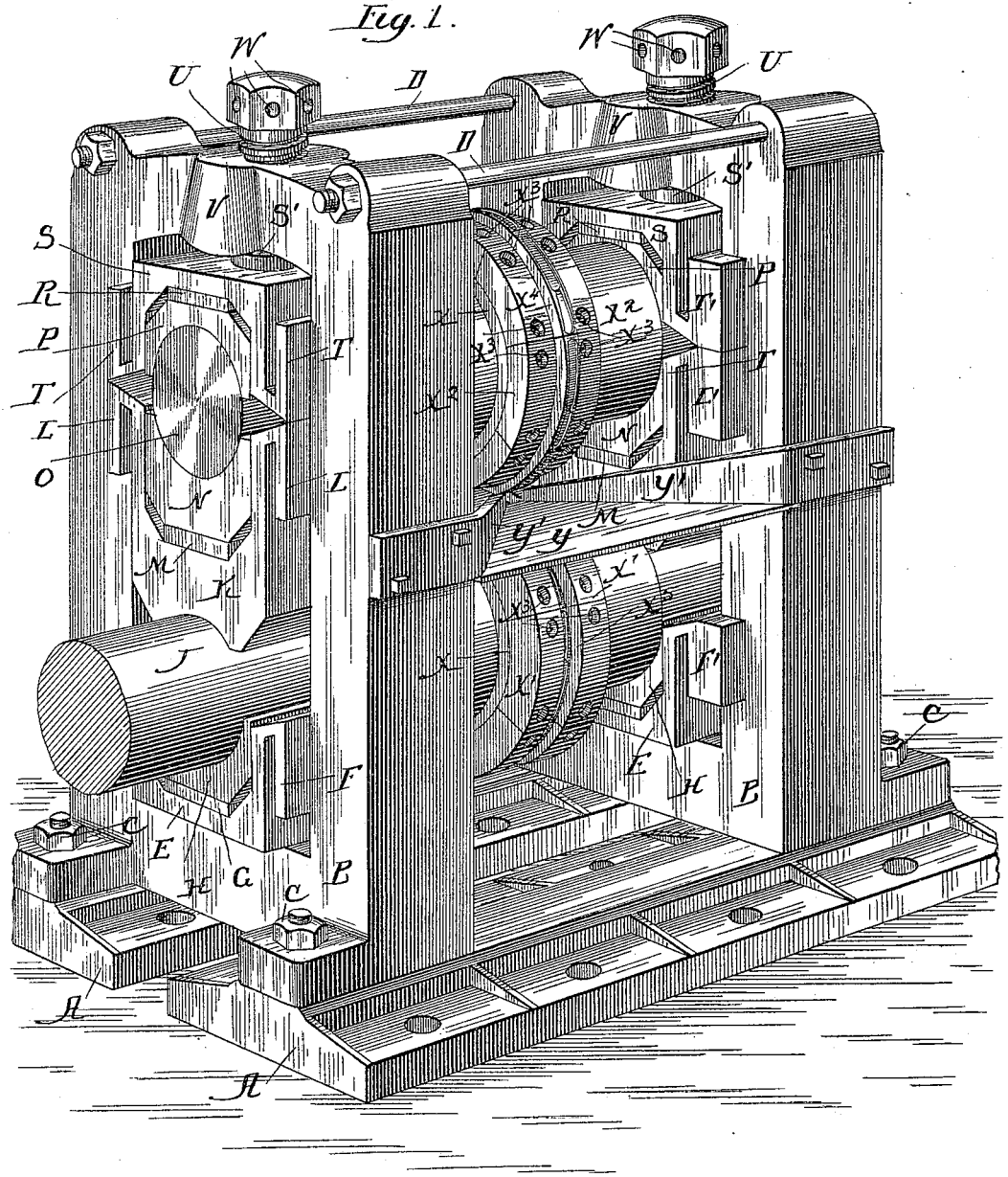

(No Model.) 5 Sheets—Sheet 1.

I. HIRSCH.
ROLLS FOR MAKING TABLE CUTLERY.

No. 438,374. Patented Oct. 14, 1890.

Witnesses:
Celeste P. Chapman.
Davida J. Johnson

Inventor:
Isaac Hirsch
Francis W. Parker
Attorney.

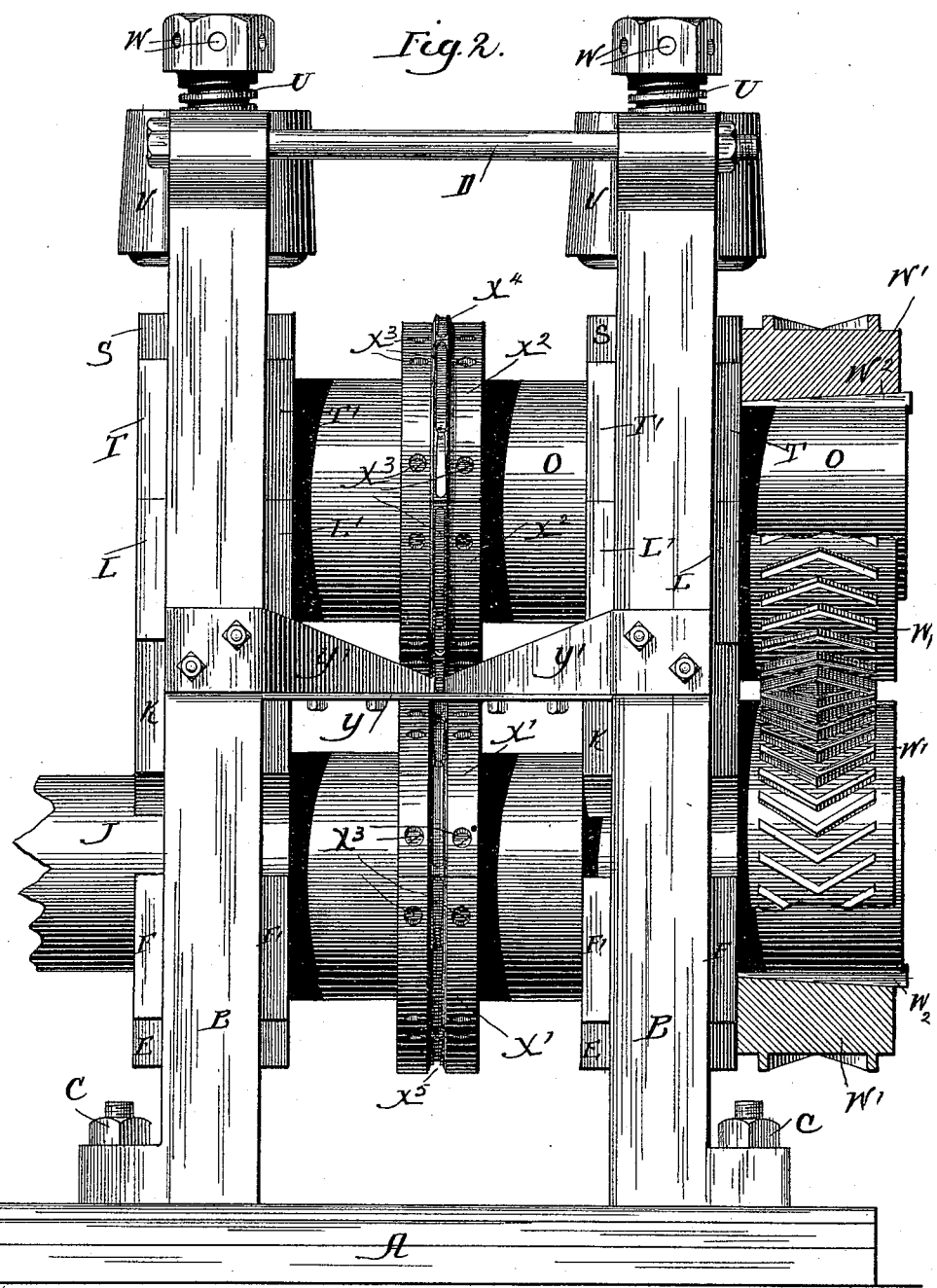

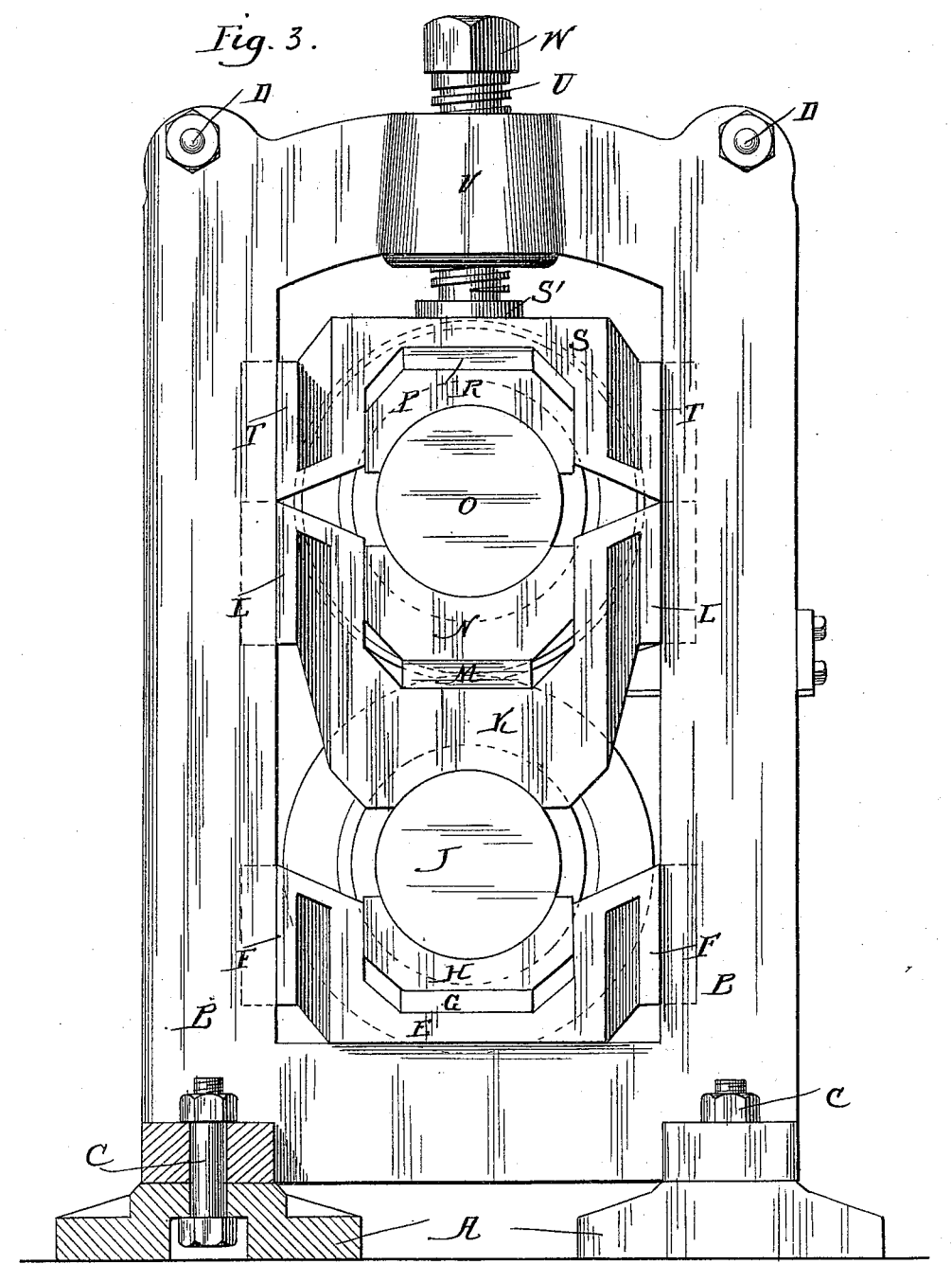

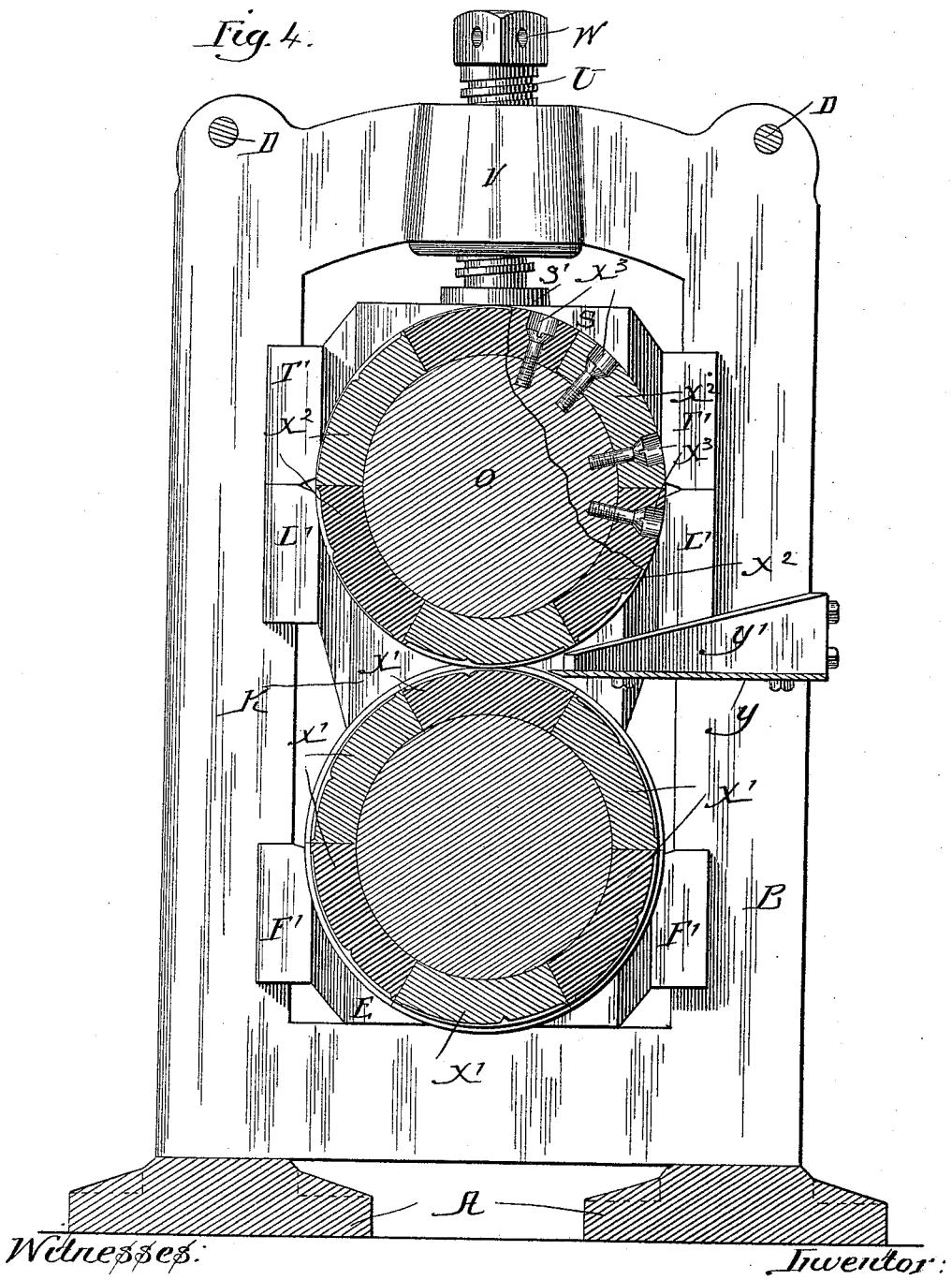

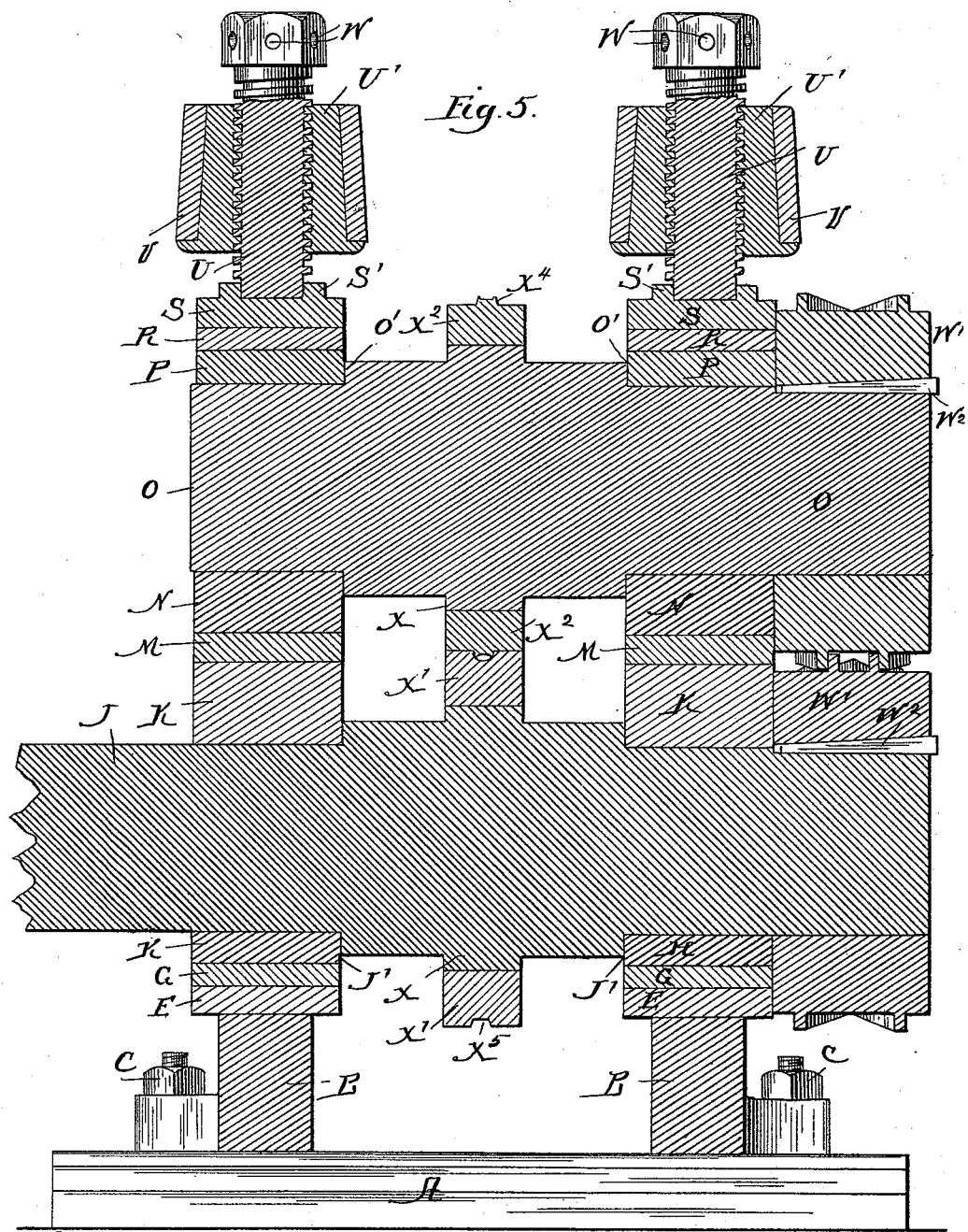

UNITED STATES PATENT OFFICE.

ISAAC HIRSCH, OF CHICAGO, ILLINOIS.

ROLLS FOR MAKING TABLE-CUTLERY.

SPECIFICATION forming part of Letters Patent No. 438,374, dated October 14, 1890.

Application filed May 12, 1890. Serial No. 351,402. (No model.)

*To all whom it may concern:*

Be it known that I, ISAAC HIRSCH, a citizen of the United States, residing at Chicago, in the county of Cook and State of Illinois, have invented a certain new and useful Improvement in Rolls for Making Table-Cutlery, of which the following is a full, clear, and exact specification.

My invention relates to mechanism for forming or stamping cutlery, and has for its object to provide a convenient machine therefor. This I illustrate in the accompanying drawings, wherein—

Figure 1 is a perspective of my invention; Fig. 2, a front view of the same; Fig. 3, a side view; Fig. 4, a cross-section at right angles to the axes of the shafts, and Fig. 5 a cross-section parallel to the axes of the shafts.

Like parts are indicated by the same letter in all the figures.

A A are the base-plates, upon which rise the standards B B. The said standards are bolted to the parts A A by the bolts C C, and they are connected above by the bars D D. Each standard is in the form of an open frame with a large central aperture in which the bearings are placed. They consist on each side of a lower box E, provided with the side portions F F, which bear upon the inside of the upright portion of the standard, and the block G, and the bearing proper H. This latter receives the end of the lower shaft J. Above this is the box portion K, which is provided with side bearings L, similar to F, and carries the block M, which supports the box N, in which rests the end of the upper shaft O. Above this is the inverted box P, and then the block R, and then the box portion S, which has the side bearing parts T T, similar to the parts L and F. These bearing portions T, F, and L are provided each with an inner lug T', L', and F' on each side, so as to prevent said boxings or portions to move laterally on the standards B B. On the upper portions S S are the rings S' S', which receive the lower ends of the screws U U, which are screw-threaded through the thimbles U' U', which are contained within the upper cross portions V V of the standards B B. Each of these screws has a head with holes W W, whereby it can be turned. The shafts J and O are enlarged within, so as to form shoulders O' and J', which are received against the boxing portions, so as to keep the parts in proper position. On one end of each of the shafts O and J are the gears W' W', held in position by the keys $W^2 W^2$. About midway of the central portion of each of the shafts is a raised ring X, and on each of these rings is secured a series of dies X' X' and $X^2 X^2$, and they are secured by means of the screws $X^3 X^3$, which are countersunk, and the dies X' are grooved at $X^5$, and in the seam of the groove lies the impression or form of the piece of cutlery to be stamped. The dies $X^2$ are provided with the raised portions $X^4$, which correspond to the grooves $X^5$, and on the outer surface of which are placed the forms of the cutlery to be stamped.

Y is a table, and Y' Y' the side bars which lie upon said table and are secured to the standards B B, and converge toward the dies at the point where they engage each other. The power is comunicated to the shaft J in any convenient manner.

The use and operation of my invention are as follows: The power is communicated to the shaft J and the same is rotated. The engagement of the gears W' W' causes the two shafts J and O to rotate in opposite directions at the same rate of speed. I have employed the kind of gear shown to secure equality of rotation of the two shafts, and hence permanency of relation of the dies. The rod of metal to be formed into cutlery—as, for example, into knives, as shown in the drawings—is put across the plate or table Y between the converging sides Y', and between the dies it passes into the lower or grooved die, where it is held securely in position during the process of the continued motion of the dies, and the metal is made conformed to the aperture remaining between the two opposed portions of the dies. Thus a series of knives is pressed or rolled out between the two dies as the operation continues. By placing one portion of the die at the bottom of a groove and the other portion on the surface of a corresponding elevation, thus bringing the edge of the latter portion against the sides of the grooves, the knives are cleanly stamped out and their edges sheared off, so as to make a perfect and finished knife. The arrangement of boxing with the projecting edges F', L', and T' and the shoulders on the shafts, which engage the portions of the boxing, as indicated in dotted lines in Fig. 3, the parts are kept securely in position and the boxing portions E, K, and S are given a firm and true bearing upon the standards B B, so that the shafts are properly placed in position and free to rotate at whatever altitude with respect to the standards B they may be supported. By varying the thickness of the blocks G, M, and S the shafts may be journaled at various positions and at various distances from each other, as may be desired, and this is rendered necessary by reason of the fact that a large variety of dies will be required and these dies will differ among themselves as to thickness. It is desirable, however, that the point of operation should always be practically in a plane with the table along which the metal is led when the parts are suitably placed in position. By turning the screws U U the portions of the boxing may be brought firmly and securely in position, where they will be retained during the operation of the machine. These dies are all made uniform in size and shape, interchangeable for any given piece of cutlery, but vary for different pieces. By inspection of Fig. 2 it will be seen that the die in question was designed for stamping out metallic knives for table use. When one set of dies is to be removed, it is only necessary to withdraw the screws $X^3 X^3$ and remove the dies and place others in their positions, and then adjust the boxing so as to bring the shafts to a proper distance from each other. It may also be added that the ridge and groove formation of the dies is further serviceable to keep the dies properly in position with reference to each other. The inside portion of the frame-shaped standard or the sides of the aperture in such standards I have spoken of as the inner sides of the standards, while the exterior sides of the standards are those portions against which the parts F', L', and T' bear.

What is meant above by stating that the dies produce a finished and perfect knife is not that the knife is absolutely finished in all its details, but that the steel portion is struck out substantially in the form in which it is to be used, and must of course be polished and ground, &c. By having one portion of the die elevated and the other depressed, so that one portion sinks into the other, it will be seen that the entire knife is cut out and its edges sheared off to make a complete and perfect knife.

Of course the machine is equally applicable to other and similar appliances included in the general term "cutlery"—as, for example, forks, spoons, and the like.

Having thus described my invention, what I claim, and desire to secure by Letters Patent, is as follows:

1. The combination of two shafts with a series of screw-holes therein and a series of die-plates extending entirely about each of such shafts, such die-plates consisting of short arc-shaped pieces and provided with suitable forming-faces and countersunk screw-holes, whereby such plates may be removably secured to the shafts.

2. The combination of die-rolls consisting of rotating dies provided one with a groove and a forming-surface at the bottom thereof, the other with a corresponding ridge and a forming-surface at the top thereof, and a sharp edge about the outline of such forming-surface, substantially as and for the purpose set forth.

3. The combination of two rotating shafts geared together and carrying, respectively, the opposed portions of dies with boxings built up of a series of parts and containing one or more removable blocks, whereby the position of said shafts with reference to each other and the frame may be varied at will by substitutions for such blocks.

4. The combination of rotating shafts, each carrying the opposed portion of the dies with a table having converging sides which terminate in the vicinity of the point of contact with the dies, so that the metal is led across such table directly to the dies at the point of contact.

5. The combination of two rotating shafts geared together, each carrying portions of the dies, with boxings for such shafts, consisting of parts which have one bearing upon at least two sides of the standards of the frame, so that said shafts may be easily and properly journaled at various positions along such standards.

6. The combination of two shafts rotating and geared together, with die portions upon such shafts, side standards in the form of frames, boxings for such shafts, which are composed of parts having bearings upon both inner sides of the frame-shaped standards and one exterior side.

7. The combination of two shafts rotating and geared together, with die portions upon such shafts, side standards in the form of frames, boxings for such shafts, which are composed of parts having bearings upon both inner sides of the frame-shaped standards and one exterior side, and shoulders upon such shafts to engage the boxings in opposition to their engagement with the exterior side of the standards, so as to hold the parts in position.

ISAAC HIRSCH.

Witnesses:
FRANCIS W. PARKER,
CELESTE P. CHAPMAN.